(12) United States Patent
Chattopadhyay et al.

(10) Patent No.: US 10,275,500 B2
(45) Date of Patent: Apr. 30, 2019

(54) SYSTEM AND METHODS FOR ANALYSIS OF DATA

(71) Applicant: Cornell University, Ithaca, NY (US)

(72) Inventors: Ishanu Chattopadhyay, Ithaca, NY (US); Hod Lipson, Ithaca, NY (US)

(73) Assignee: Cornell University, Ithaca, NY (US)

( * ) Notice: Subject to any disclaimer, the term of this patent is extended or adjusted under 35 U.S.C. 154(b) by 862 days.

(21) Appl. No.: 14/431,131

(22) PCT Filed: Sep. 27, 2013

(86) PCT No.: PCT/US2013/062397
§ 371 (c)(1),
(2) Date: Mar. 25, 2015

(87) PCT Pub. No.: WO2014/052885
PCT Pub. Date: Apr. 3, 2014

(65) Prior Publication Data
US 2015/0242469 A1    Aug. 27, 2015

Related U.S. Application Data

(60) Provisional application No. 61/706,583, filed on Sep. 27, 2012, provisional application No. 61/762,100, filed on Feb. 7, 2013.

(51) Int. Cl.
*G06F 17/30* (2006.01)
*G06K 9/00* (2006.01)
*G06K 9/62* (2006.01)
*G06F 17/18* (2006.01)

(52) U.S. Cl.
CPC ........ *G06F 17/30539* (2013.01); *G06F 17/18* (2013.01); *G06F 17/30622* (2013.01); *G06F 17/30864* (2013.01); *G06K 9/00496* (2013.01); *G06K 9/6201* (2013.01)

(58) Field of Classification Search
None
See application file for complete search history.

(56) References Cited

U.S. PATENT DOCUMENTS

| | | |
|---|---|---|
| 5,600,835 A | 2/1997 | Garland et al. |
| 6,018,735 A | 1/2000 | Hunter |
| 7,403,814 B2 * | 7/2008 | Cox ........ A61B 5/048 600/544 |

(Continued)

OTHER PUBLICATIONS

Chattopadhyay et al., Pattern classification in Symbolic Streams via Semantic Annihilation of Information, American Control Conference, pp. 492-497, 2010, retrieved from the Internet URL http://arxiv.org/pdf/1008.3667.

*Primary Examiner* — Tarek Chbouki
(74) *Attorney, Agent, or Firm* — Valauskas Corder LLC

(57) ABSTRACT

Data processing including a universal metric to quantify and estimate the similarity and dissimilarity between data sets. Data streams are perfectly annihilated by a correct realization of their anti-streams. Any deviation of the collision product from a baseline, for example flat white noise, quantifies statistical dissimilarity. The invention relates generally to data mining. More specifically, the invention relates to the analysis of data using a universal metric to quantify and estimate the similarity and dissimilarity between sets of data.

5 Claims, 3 Drawing Sheets

(56) References Cited

U.S. PATENT DOCUMENTS

| | | | |
|---|---|---|---|
| 2004/0190596 A1* | 9/2004 | Lehmann | H04B 1/692 |
| | | | 375/138 |
| 2006/0120583 A1* | 6/2006 | Dewaele | G06T 3/0068 |
| | | | 382/128 |
| 2007/0238415 A1 | 10/2007 | Sinha et al. | |
| 2010/0249629 A1* | 9/2010 | Schmidt | A61B 7/04 |
| | | | 600/528 |
| 2014/0079297 A1* | 3/2014 | Tadayon | G06K 9/00 |
| | | | 382/118 |

* cited by examiner

| Stream Operation | | Algorithmic Procedure (Pseudocode) |
|---|---|---|
| ■ Independent Stream Copy[†] | | 1 Generate stream $\omega_0$ from FWN |
| | Generate an independent sample path from the same hidden stochastic source. | 2 Read current symbol $\sigma_1$ from $s$, and $\sigma_2$ from $\omega_0$ |
| | | 3 If $\sigma_1 = \sigma_2$, then write $\sigma_1$ to output $s'$ |
| | | 4 Move read positions one step to right, and go to step 1 |
| | | *This operation is required internally in stream inversion.* |
| ■ Stream Inversion[†] | | 1 Generate $|\Sigma| - 1$ independent copies of $s$: $s_1, \cdots, s_{|\Sigma|-1}$ |
| | Generate a sample path from the inverse model of the hidden source. | 2 Read current symbols $\sigma_i$ from $s_i$ ($i = 1, \cdots, |\Sigma| - 1$) |
| | | 3 If $\sigma_i \neq \sigma_j$ for all distinct $i, j$, then write $\Sigma \setminus \bigcup_{i=1}^{|\Sigma|-1} \sigma_i$ to output $s'$ |
| | | 4 Move read positions one step to right, and go to step 1 |
| ■ Stream Summation[†] | | 1 Read current symbols $\sigma_i$ from $s_i$ ($i = 1, 2$) |
| | Generating a sample path from sum of hidden sources. | 2 If $\sigma_1 = \sigma_2$, then write to output $s'$ |
| | | 3 Move read positions one step to right, and go to step 1 |
| ■ Deviation from Flat White Noise (FWN)[‡] | | |
| | Estimating the deviation of a symbolic stream from FWN. | $\zeta(s, \ell) = \dfrac{|\Sigma| - 1}{|\Sigma|} \displaystyle\sum_{x: 1 \leq |x| \leq \ell} \dfrac{\|\phi^s(x) - \mathcal{U}_\Sigma\|_\infty}{|\Sigma|^{2|x|}}$ | where,

- $|\Sigma|$ is the alphabet size, $|x|$ is the length of the string $x$
- $\ell$ is the maximum length of strings upto which the sum is evaluated. For a given value of the threshold $\epsilon^\star$, we choose $\ell = \ln(1/\epsilon^\star)/\ln(|\Sigma|)$ (See SI text, Proposition S-15)
- $\mathcal{U}_\Sigma$ is the uniform probability vector of length $|\Sigma|$
- For $\sigma_i \in \Sigma$, $\phi^s(x)|_i = \dfrac{\text{\# of occurrences of } x\sigma_i \text{ in string } s}{\text{\# of occurrences of } x \text{ in string } s}$ (Symbolic derivatives[§] (Definition S-9) in SI text Section S-B formalizes $\phi^s(\cdot)$. If $s$ is generated by a FWN process, then $\phi^s(x) \to \mathcal{U}_\Sigma$ for any $x \in \Sigma^\star$, and hence $\zeta(s, \ell) \to 0$.)

FIG. 2

SYSTEM AND METHODS FOR ANALYSIS OF DATA

CROSS-REFERENCE TO RELATED APPLICATIONS

The present application claims priority to U.S. Provisional Patent Application Ser. No. 61/706,583 filed Sep. 27, 2012 and U.S. Provisional Patent Application Ser. No. 61/762,100 filed Feb. 7, 2013, hereby incorporated by reference.

GOVERNMENT FUNDING

The invention was made with government support under grant number ESS 8314 awarded by the Defense Threat Reduction Agency (DTRA). The United States Government has certain rights in the invention. The United States government has certain rights in this invention.

FIELD OF THE INVENTION

The invention relates generally to data mining. More specifically, the invention relates to the analysis of data using a universal metric to quantify and estimate the similarity and dissimilarity between sets of data.

BACKGROUND OF THE INVENTION

From automatic speech recognition to discovering unusual stars, underlying almost all automated discovery tasks is the ability to compare and contrast data. Yet despite the prevalence of computing power and abundance of data, understanding exactly how to perform this comparison has resisted automation.

A key challenge is that most data comparison algorithms today rely on a human expert to specify the important distinguishing "features" that characterize a particular data set. Nearly all automated discovery systems today rely, at their core, on the ability to compare data—from automatic image recognition to discovering new astronomical objects—, such systems must be able to compare and contrast data records in order to group them, classify them, or identify the odd-one-out. Despite rapid growth in the amount of data collected and the increasing rate at which it can be processed, analysis of quantitative data streams still relies heavily on knowing what to look for.

Any time a data mining algorithm searches beyond simple correlations, a human expert must help define a notion of similarity—by specifying important distinguishing features of the data to compare, or by training learning algorithms using copious amounts of examples. Determining the similarity between two data streams is key to any data mining process, but relies heavily on human-prescribed criteria.

Research in machine learning is dominated by the search for good "features", which are typically understood to be heuristically chosen discriminative attributes characterizing objects or phenomena of interest. The ability of experts to manually define appropriate features for data summarization is not keeping pace with the increasing volume, variety and velocity of big data. Moreover, the number of characterizing features i.e. the size of the feature set, needs to be relatively small to avoid intractability of the subsequent learning algorithms. Such small sets of discriminating attributes are often hard to find. Additionally, their heuristic definition precludes any notion of optimality; it is impossible to quantify the quality of a given feature set in any absolute terms; thus, only allowing a comparison of how it performs in the context of a specific task against a few selected variations.

A number of deep learning approaches have been recently demonstrated that learn features automatically, but typically require large amounts of data and computational effort to train. In addition to the heuristic nature of feature selection, machine learning algorithms typically necessitate the choice of a distance metric in the feature space. For example, the classic "nearest neighbor" k-NN classifier requires definition of proximity, and the k-means algorithm depends on pairwise distances in the feature space for clustering. The choice of the metric crucially impacts both supervised and unsupervised learning algorithms, and has recently led to approaches that learn appropriate metrics from data.

To side-step the heuristic metric problem, a number of recent approaches attempt to learn appropriate metrics directly from data. Some supervised approaches to metric learning can "back out" a metric from side information or labeled constraints. Unsupervised approaches have exploited a connection to dimensionality reduction and embedding strategies, essentially attempting to uncover the geometric structure of geodesics in the feature space (e.g. manifold learning). However, such inferred geometric structures are, again, strongly dependent on the initial heuristic choice of the feature set. Since Euclidean distances between feature vectors are often misleading, heuristic features make it impossible to conceive of a task-independent universal metric in the feature space. While the advantage of considering the notion of similarity between data instead of between feature vectors has been recognized, the definition of similarity measures has remained intrinsically heuristic and application dependent.

Thus, there is a need for an automated, universal metric to estimate the differences and similarities between arbitrary data streams in order to eliminate the reliance on expert-defined features or training. The invention satisfies this need.

SUMMARY OF THE INVENTION

The invention is a system and methods that estimates the similarity between the sources of arbitrary data streams without any use of domain knowledge or training. This is accomplished through use of anti-streams.

Specifically, the invention comprises a new approach to feature-free classification based on a new application-independent notion of similarity between quantized sample paths observed from hidden stochastic processes. In short, the invention formalizes an abstract notion of inversion and pairwise summation of sample paths, and a universal metric quantifies the degree to which the summation of the inverted copy of any one set to the other annihilates the existing statistical dependencies, leaving behind flat white noise. Specifically, the invention presents a new featureless approach to unsupervised classification that circumvents the need for features altogether and does not require training, and hence is of substantial practical and theoretical interest to data analysis and pattern discovery, especially when dealing with large amounts of data where we do not know what features to look for.

According to the invention, every data set or data stream has an anti-stream, which is used for "data smashing". For purposes of this application, the term "data smashing" refers to algorithmically colliding a data set of information and its corresponding inverse of anti-information to reveal the differences and similarities between the data.

The term "anti-information" is also referred to as "anti-stream", which contains the "opposite" information from the original data stream, and is produced by algorithmically inverting the statistical distribution of symbol sequences appearing in the original stream. For example, sequences of digits that were common in the original stream are rare in the anti-stream, and vice versa. Streams and anti-streams are algorithmically collided in a way that systematically cancels any common statistical structure in the original streams, leaving only information relating to their statistically significant differences.

Data smashing involves at least two data streams and proceeds by quantizing the raw data, for example, by converting or mapping a continuous value to a string of symbols. The simplest example of such quantization is where all positive values are mapped to the symbol "1" and all negative values to "0", thus generating a series of symbols. Next, one of the quantized input streams is selected and its anti-stream generated. Finally, this anti-stream is annihilated against the remaining quantized input stream and the information that remains is measured or identified. The remaining information is estimated from the deviation of the resultant stream from a baseline stream, for example flat white noise (FWN).

Since a data stream is perfectly annihilated by a correct realization of its anti-stream, any deviation of the collision product or remaining information from noise quantifies statistical dissimilarity. Using this causal similarity metric, streams can be clustered, classified, or identified, for example identifying stream segments that are unusual or different. The algorithms are linear in input data, implying they can be applied efficiently to streams in near-real time. Importantly, data smashing can be applied without understanding where the streams were generated, how they are encoded, and what they represent.

Ultimately, from a collection of data streams and their pairwise similarities, it is possible to automatically "back out" the underlying metric embedding of the data, revealing its hidden structure for use with traditional machine learning methods.

The invention differs from "mutual information" in that mutual information measures dependence between data streams whereas "data smashing" computes a distance between the generative processes themselves. As an example, two independent streams from a series of independent coin-flips necessarily have zero mutual information, but data smashing is able to identify the streams as similar, being generated by the same stochastic process (sequence of independent coin flips). Similarity computed via data smashing is clearly a function of the statistical information buried in the input streams. The invention reveals this hidden information, particularly without expert knowledge or a training set.

The invention is capable of analyzing data from a variety of real-world challenge problems, including for example, the disambiguation of electro-encephalograph patterns pertaining to epileptic seizures, the detection of anomalous cardiac activity from heart sound recordings, and the classification of astronomical objects from raw photometry. More specifically, the invention is pertinent to any application that utilizes data in the form of an ordered series of symbols. The term "symbol" includes any letter, number, digit, character, sign, figure, mark, icon, image, vector, matrix, polynomial, element or representation. The term "number" includes, for example, integers, rational numbers, real numbers, or complex numbers.

Further examples of data in the form of an ordered series of symbols includes, for example, such as acoustic waves from a microphone, light intensity over time from a telescope, traffic density along a road, or network activity from a router.

Without access to any domain knowledge, data smashing results in performance that meets or exceeds the accuracy of specialized algorithms exploiting heuristics tuned by domain experts, which may open the door to understanding complex phenomena in diverse fields of science, especially when experts don't know what to look for.

The invention and its attributes and advantages may be further understood and appreciated with reference to the detailed description below of one contemplated embodiment, taken in conjunction with the accompanying drawings.

DESCRIPTION OF THE DRAWING

The accompanying drawings, which are incorporated in and constitute a part of this specification, illustrate an implementation of the invention and, together with the description, serve to explain the advantages and principles of the invention:

FIG. 2 illustrates algorithmic components according to one embodiment of the invention.

DETAILED DESCRIPTION OF THE INVENTION

According to the invention, data smashing is based on an application-independent notion of similarity between quantized sample paths observed from hidden stochastic processes using a universal metric. The universal metric quantifies the degree to which the summation of the inverted copy of any one stream to the other annihilates the existing statistical dependencies, leaving behind flat white noise thereby circumventing the need for features altogether and without the requirement of training.

Despite the fact that the estimation of similarities between two data streams is performed in absence of the knowledge of the underlying source structure or its parameters, the universal metric is causal, i.e., with sufficient data it converges to a well-defined distance between the hidden stochastic sources themselves, without ever knowing them explicitly.

Figure 1:
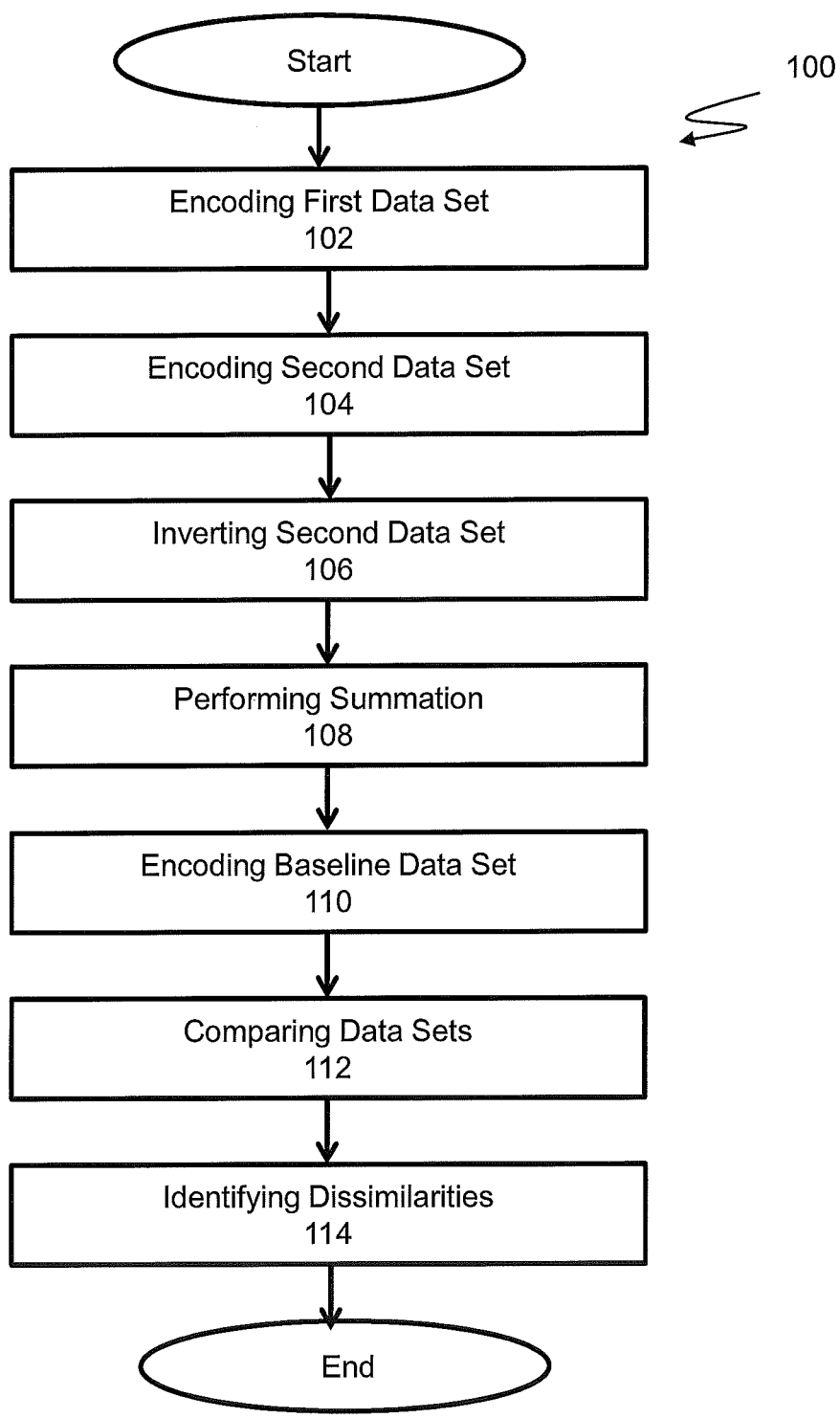
FIG. 1 illustrates a flow chart of method steps according to one embodiment of the invention.

FIG. 1 illustrates a flow chart 100 of method steps according to one embodiment of the invention. At step 102, a first data set is encoded to obtain a first encoded data set. At step 104, a second data set is encoded to obtain a second encoded data set. At step 106, the second encoded data set is inverted to obtain an inverted data set. Summation is performed at step 108 in which the first encoded data set and the inverted data set are combined to generate a combined stream or summed data set. At step 110, a baseline data set is encoded to obtain a baseline encoded data set. At step 112, the summed data set and the baseline encoded data set are compared to identify one or more dissimilarities between the first data set and the second data set at step 114.

The data sets can be encoded into a series of symbols, for example any letter, number, digit, character, sign, figure, mark, icon, image, vector, matrix, polynomial, element or representation. In one embodiment, the series of symbols include the number "1" and the number "0"; however, any number is contemplated. Encoding data sets may further comprise quantizing the data set and mapping one or more portions of the quantized data set to a symbol, which is then used to "data smash" with a symbol of the baseline data set. The baseline data set can be any set of data used for a comparison. In one embodiment, the baseline data set is flat white noise.

Quantized Stochastic Processes (QSPs) which capture the statistical structure of symbolic streams can be modeled using probabilistic automata, provided the processes are ergodic and stationary. For the purpose of computing a similarity metric, it is required that the number of states in the automata be finite. In other words, the existence of a generative Probabilistic Finite State Automata (PFSA) is assumed. A slightly restricted subset of the space of all PFSA over a fixed alphabet admits an Abelian group structure, wherein the operations of commutative addition and inversion are well-defined. The term "alphabet" refers to a series of symbols or symbols arranged in a sequential order.

A trivial example of an Abelian group is the set of reals with the usual addition operation; addition of real numbers is commutative and each real number "a" has a unique inverse "−a", which when summed produces a unique identity. Key group operations, necessary for classification, can be carried out on the observed sequences alone, without any state synchronization or reference to the hidden generators of the sequences.

Existence of a group structure implies that given PFSAs G and H, sums G+H, G−H, and unique inverses −G and −H are well-defined. Since individual symbols have no notion of a "sign", the anti-stream of a sequence is a fragment that has inverted statistical properties in terms of the occurrence patterns of the symbols. Therefore, for a PFSA G, the unique inverse −G is the PFSA which when added to G yields the group identity W=G+(−G), referred to as the "zero model". It should be noted that the zero model W is characterized by the property that for any arbitrary PFSA H in the group, then H+W=W+H=H.

For any fixed alphabet size, the zero model is the unique single-state PFSA up to minimal description that generates symbols as consecutive realizations of independent random variables with uniform distribution over the symbol alphabet. Thus W generates flat white noise (FWN), and the entropy rate of FWN achieves the theoretical upper bound among the sequences generated by arbitrary PFSA in the model space. Two PFSAs G and H are identical if and only if G+(−H)=W.

In addition to the Abelian group, the PFSA space admits a metric structure. The distance between two models thus can be interpreted as the deviation of their group-theoretic difference from a FWN process. Information annihilation exploits the possibility of estimating causal similarity between observed data streams by estimating this distance from the observed sequences alone without requiring the models themselves.

FIG. 2 illustrates algorithmic components according to one embodiment of the invention. The distance of the hidden generative model from FWN can be estimated given only an observed stream s. This is achieved by the function $\zeta$. Intuitively, given an observed sequence fragment x, the first computation is the deviation of the distribution of the next symbol from the uniform distribution over the alphabet. The sum of these deviations is $\zeta(s,l)$ for all historical fragments x with length up to l, weighted by $1/|\Sigma|^{2|x|}$. The weighted sum ensures that deviation of the distributions for longer x have smaller contribution to $\zeta(s,l)$, which addresses the issue that the occurrence frequencies of longer sequences are more variable.

According to the invention two sets of sequential observations have the same generative process if the inverted copy of one can annihilate the statistical information contained in the other. Given two symbol streams $s_1$ and $s_2$, the underlying PFSAs (say $G_1;G_2$) can be checked to determine if they satisfy the annihilation equality: $G_1+(−G_2)=W$ without explicitly knowing or constructing the models themselves.

Data smashing is predicated on being able to invert and sum streams, and to compare streams to noise. Inversion generates a stream s' given a stream s, such that if PFSA G is the source for s, then −G is the source for s'. Summation collides two streams $s_1$ and $s_2$ to generate a new stream s' which is a realization of FWN if and only if the hidden models $G_1;G_2$ satisfy $G_1+G_2=W$. Finally, deviation of a stream s from that generated by a FWN process can be calculated directly.

Importantly, for a stream s (with generator G), the inverted stream s' is not unique. Any symbol stream generated from the inverse model −G qualifies as an inverse for s; thus anti-streams are non-unique. What is indeed unique is the generating inverse PFSA model. Since the invention compares the hidden stochastic processes and not their possibly non-unique realizations, the non-uniqueness of anti-streams is not problematic.

Despite the possibility of mis-synchronization between hidden model states, applicability of the algorithms shown in FIG. 2 for disambiguation of hidden dynamics is valid. Algorithmic components of a computer method for analyzing data include generating a sample path from a hidden stochastic source and generating a sample path from the inverse model of the hidden stochastic source. A third sample path is generated from a sum of hidden stochastic sources so that a deviation of a symbolic stream from flat white noise can be estimated.

Estimating the deviation of a stream from FWN is straightforward (as specified by $\zeta(s,l)$ in FIG. 2, row 4). All subsequences of a given length must necessarily occur with the same frequency for a FWN process; and the deviation is estimated from this behavior in the observed sequence. The other two tasks are carried out via selective erasure of symbols from the input stream(s) (See FIG. 2, rows 1-3). For example, summation of streams is realized as follows: given two streams $s_1$ and $s_2$, a symbol is read from each stream and if they match then it forms part of the combined stream, and the symbols are ignored when they do not match. Thus, data smashing allows the manipulation of streams via selective erasure, to estimate a distance between the hidden stochastic sources.

Figure 3:
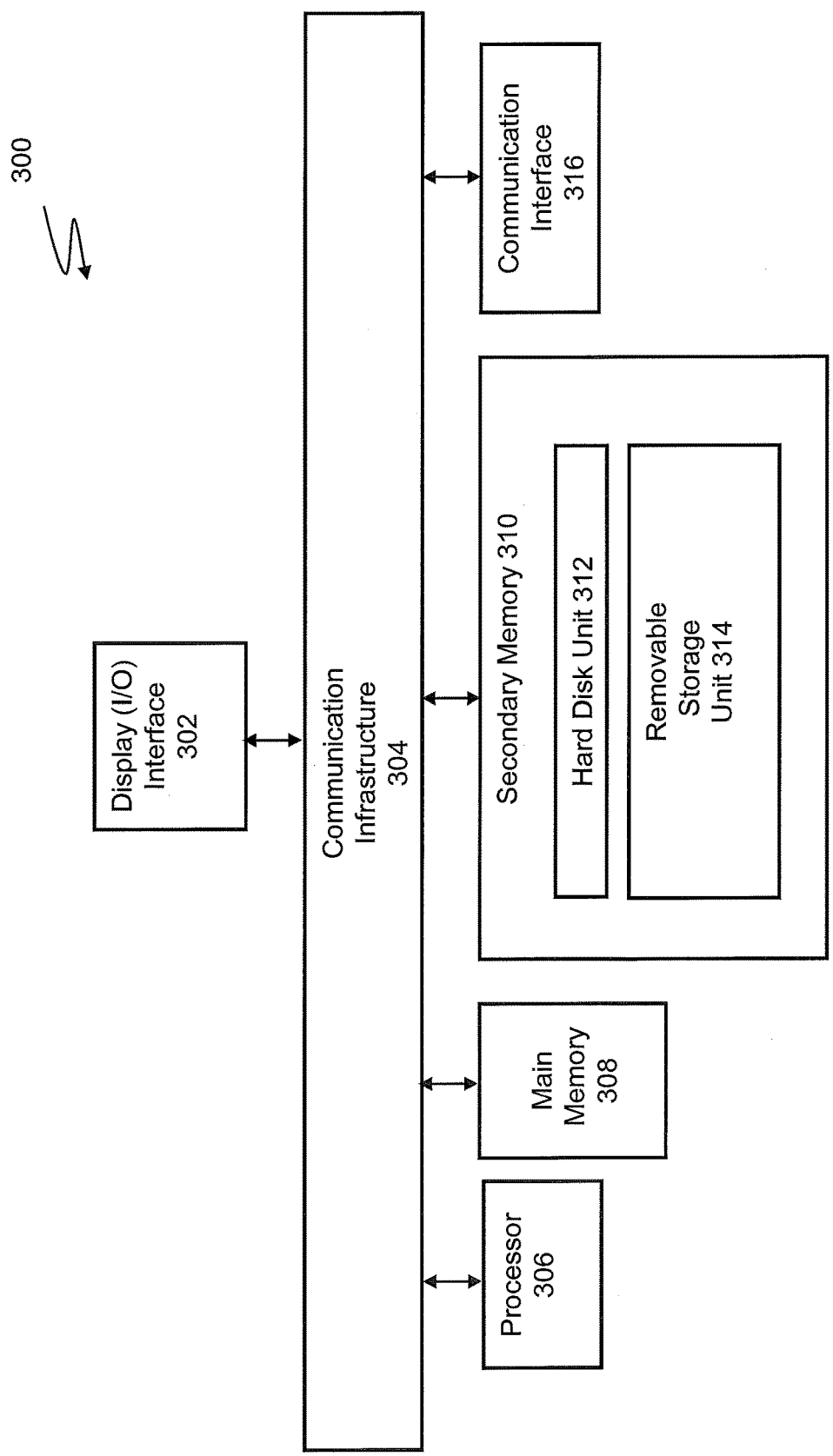
FIG. 3 illustrates an exemplary computer system that may be used to implement the methods according to the invention.

FIG. 3 illustrates an exemplary computer system 300 that may be used to implement the methods according to the invention. One or more computer systems 300 may carry out the methods presented herein as computer code.

Computer system 300 includes an input/output display interface 302 connected to communication infrastructure 304—such as a bus—, which forwards data such as graphics, text, and information, from the communication infrastructure 304 or from a frame buffer (not shown) to other components of the computer system 300. The input/output display interface 302 may be, for example, a keyboard, touch screen, joystick, trackball, mouse, monitor, speaker, printer, any other computer peripheral device, or any combination thereof, capable of entering and/or viewing data.

Computer system 300 includes one or more processors 306, which may be a special purpose or a general-purpose digital signal processor that processes certain information. Computer system 300 also includes a main memory 308, for example random access memory ("RAM"), read-only memory ("ROM"), mass storage device, or any combination thereof. Computer system 300 may also include a secondary memory 310 such as a hard disk unit 312, a removable storage unit 314, or any combination thereof. Computer system 300 may also include a communication interface 316, for example, a modem, a network interface (such as an Ethernet card or Ethernet cable), a communication port, a PCMCIA slot and card, wired or wireless systems (such as Wi-Fi, Bluetooth, Infrared), local area networks, wide area networks, intranets, etc.

It is contemplated that the main memory 308, secondary memory 310, communication interface 316, or a combination thereof, function as a computer usable storage medium, otherwise referred to as a computer readable storage medium, to store and/or access computer software including computer instructions. For example, computer programs or other instructions may be loaded into the computer system 300 such as through a removable storage device, for example, a floppy disk, ZIP disks, magnetic tape, portable flash drive, optical disk such as a CD or DVD or Blu-ray, Micro-Electro-Mechanical Systems ("MEMS"), nanotechnological apparatus. Specifically, computer software including computer instructions may be transferred from the removable storage unit 314 or hard disc unit 312 to the secondary memory 310 or through the communication infrastructure 304 to the main memory 308 of the computer system 300.

Communication interface 316 allows software, instructions and data to be transferred between the computer system 300 and external devices or external networks. Software, instructions, and/or data transferred by the communication interface 316 are typically in the form of signals that may be electronic, electromagnetic, optical or other signals capable of being sent and received by the communication interface 316. Signals may be sent and received using wire or cable, fiber optics, a phone line, a cellular phone link, a Radio Frequency ("RF") link, wireless link, or other communication channels.

Computer programs, when executed, enable the computer system 300, particularly the processor 306, to implement the methods of the invention according to computer software including instructions.

The computer system 300 described herein may perform any one of, or any combination of, the steps of any of the methods presented herein. It is also contemplated that the methods according to the invention may be performed automatically, or may be invoked by some form of manual intervention.

The computer system 300 of FIG. 3 is provided only for purposes of illustration, such that the invention is not limited to this specific embodiment. It is appreciated that a person skilled in the relevant art knows how to program and implement the invention using any computer system.

The computer system 300 may be a handheld device and include any small-sized computer device including, for example, a personal digital assistant ("PDA"), smart handheld computing device, cellular telephone, or a laptop or netbook computer, hand held console or MP3 player, tablet, or similar hand held computer device, such as an iPad®, iPad Touch® or Phone®.

In one embodiment, the invention is considered with respect to sequential observations, for example, a time series of sensor data. The possibly continuous-valued sensory observations are mapped to discrete symbols via pre-specified quantization of the data range. Each symbol represents a slice of the data range, and the total number of slices define the symbol alphabet $\Sigma$ (where $|\Sigma|$ denotes the alphabet size). The coarsest quantization has a binary alphabet consisting of 0 and 1 (it is not important what symbols are used for example, the letters of the alphabet can be represented by "a" and "b"), but finer quantizations with larger alphabets are also possible. An observed data stream is thus mapped to a symbolic sequence over this pre-specified alphabet with the assumption that the symbol alphabet and its interpretation is fixed for a particular task. Quantization involves some information loss which can be reduced with finer alphabets at the expense of increased computational complexity. Quantization schemes are used that require no domain expertise such as expert knowledge or a training set.

In other embodiments, the universal metric of the invention is utilized in applications to identify epileptic pathology, identify a heart murmur, and classify variable stars from photometry. Data smashing begins with quantizing streams to symbolic sequences, followed by the use of the annihilation circuit (FIG. 2) to compute pairwise causal similarities.

In the classification of brain electrical activity from different physiological and pathological brain states, sets of data included electroencephalographic (EEG) data sets consisting of surface EEG recordings from healthy volunteers with eyes closed and open, and intracranial recordings from epilepsy patients during seizure free intervals from within and from outside the seizure generating area, as well as intracranial recordings of seizures.

Starting with the data sets of electric potentials, sequences of relative changes between consecutive values before quantization were generated. This step allows a common alphabet for sequences with wide variability in the sequence mean values. The distance matrix from pairwise smashing yielded clear clusters corresponding to seizure, normal eyes open (EO), normal eyes closed (EC) and epileptic pathology in non-seizure conditions.

In the classification of cardiac rhythms from noisy heatsound data recorded using a digital stethoscope, data sets were analyzed corresponding to healthy rhythms and murmur, to verify if clusters could be identified without supervision that correspond to the expert-assigned labels. Classification precision for murmur was 75.2%).

In the classification of variable stars using light intensity series (photometry) from the Optical Gravitational Lensing Experiment (OGLE) survey, supervised classification of photometry proceeds by first "folding" each light-curve to its known period to correct phase mismatches. In one analysis, starting with folded light-curves, a data set is generated data of the relative changes between consecutive brightness values in the curves before quantization, which allows for the use of a common alphabet for light curves with wide variability in the mean brightness values. A classification accuracy of 99:8% was observed. In another analysis, data smashing worked without knowledge of the period of the variable star; skipping the folding step as described above. Smashing raw photometry data yielded a classification accuracy of 94.3% for the two classes The described embodiments are to be considered in all respects only as illustrative and not restrictive, and the scope of the invention is not limited to the foregoing description. Those of skill in the art may recognize changes, substitutions, adaptations and other modifications that may nonetheless come within the scope of the invention and range of the invention.

The invention claimed is:

1. A computer method for analyzing two or more data sets using algorithmic components, comprising the steps of:
 generating a first sample data set from a hidden stochastic source including the steps of:
  generating an independent stream $\omega_0$ from flat white noise;
  reading a first symbol $\sigma_1$ from a first symbol stream $s_1$ and a second symbol $\sigma_2$ from the independent stream $\omega_0$, wherein each of the first symbol $\sigma_1$ and the second symbol $\sigma_2$ are one selected from the group comprising: a letter, a number, a digit, a character, a sign, a figure, a mark, an icon, an image, a vector, a matrix, and a polynomia;
  writing the first symbol stream $s_1$ to an output inverted stream s' if the first symbol $\sigma_1$ is equal to the second symbol $\sigma_2$;
 generating a second sample data set from an inverse hidden stochastic source including the steps of:
  generating a number of $|\Sigma|-1$ independent copies of the first symbol stream $s_1$, wherein $|\Sigma|$ is a binary alphabet size consisting of the numbers 0 and 1;
  reading a current symbol $\sigma_i$ from an inverse symbol stream $s_i$, wherein i=1, . . . , $|\Sigma|-1$;
  writing $$\bigcup_{i=1}^{|\Sigma|-1} \Sigma$$

$\sigma_i$ to the output inverted stream s' if $\sigma_i \neq \sigma_j$ for all distinct i, j;
 generating a third sample data set from a sum of the hidden stochastic source and the inverse hidden stochastic source including the steps of:
  reading the current symbol $\sigma_i$ from the inverse symbol stream $s_i$, wherein i=1, 2;
  writing the first symbol stream $\sigma_1$ to the output inverted stream s' if the first symbol $\sigma_1$ is equal to the second symbol $\sigma_2$; and
 estimating a deviation of a symbolic stream from the flat white noise to quantify a similarity or a dissimilarity between the two or more data sets including the steps of:
  calculating a sum of deviations according to the following equation $$\hat{\zeta}(s,\ell) = \frac{|\Sigma|-1}{|\Sigma|} \sum_{x:|x|\leq\ell} \frac{\|\Phi^s(x) - \mathcal{U}_{|\Sigma|}\|_\infty\|}{|\Sigma|^{2|x|}}$$

wherein $|\Sigma|$ is the binary alphabet size, $|x|$ is a length of a string x, l is maximum length of strings up to which the sum is evaluated, $u_{|\Sigma|}$ is a uniform probability vector of length $|\Sigma|$, and for $\sigma_i \in$ $$\Sigma, \Phi^s(x)|_i = \frac{\text{\# of occurrences of } x\sigma_i \text{ in string } s}{\text{\# of occurrences of } x \text{ in string } s}.$$

2. The computer method for analyzing data according to claim 1, wherein the data of the two or more data sets is sensor data.

3. The computer method for analyzing data according to claim 2, wherein the data of the two or more data sets is electroencephalographic (EEG) data.

4. The computer method for analyzing data according to claim 2, wherein the data of the two or more data sets is digital stethoscope data.

5. The computer method for analyzing data according to claim 2, wherein the data of the two or more data sets is photometry data.

* * * * *